(12) United States Patent
Gaknoki et al.

(10) Patent No.: US 8,462,523 B2
(45) Date of Patent: Jun. 11, 2013

(54) PHASE ANGLE MEASUREMENT OF A DIMMING CIRCUIT FOR A SWITCHING POWER SUPPLY

(75) Inventors: Yury Gaknoki, San Jose, CA (US); Mingming Mao, Cupertino, CA (US); Tiziano Pastore, Monza (IT)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/332,107

(22) Filed: Dec. 20, 2011

(65) Prior Publication Data

US 2012/0092902 A1 Apr. 19, 2012

Related U.S. Application Data

(63) Continuation of application No. 12/702,963, filed on Feb. 9, 2010, now Pat. No. 8,102,683.

(51) Int. Cl.
*H02H 7/122* (2006.01)

(52) U.S. Cl.
USPC .................................... 363/56.11; 363/21.13

(58) Field of Classification Search
USPC ........ 363/56.11, 56.1, 21.12, 21.13; 315/291, 315/307
See application file for complete search history.

(56) References Cited

U.S. PATENT DOCUMENTS

| | | | |
|---|---|---|---|
| 3,818,321 A | 6/1974 | Willner et al. | |
| 4,011,499 A | 3/1977 | Betsill et al. | |
| 4,633,161 A * | 12/1986 | Callahan et al. | 323/242 |
| 7,035,122 B2 | 4/2006 | Kim et al. | |
| 7,539,028 B2 | 5/2009 | Bäurle et al. | |
| 7,551,460 B2 | 6/2009 | Lalithambika et al. | |
| 7,898,823 B2 | 3/2011 | Wu | |
| 2010/0141173 A1 | 6/2010 | Negrete | |

* cited by examiner

*Primary Examiner* — Shawn Riley
(74) *Attorney, Agent, or Firm* — Blakely Sokoloff Taylor & Zafman LLP (57) ABSTRACT

An example controller for a switched mode power supply includes a zero-crossing detector and a drive signal generator. The zero-crossing detector is coupled to generate a zero-crossing signal representative of a phase angle of a dimmer output voltage for a half line cycle of the power supply. The drive signal generator controls switching of a switch to regulate an output of the power supply in response to a feedback signal representative of the output. The drive signal generator further controls switching of the switch to adjust dimming of the output of the power supply in response to the phase angle indicated by the zero-crossing signal.

20 Claims, 7 Drawing Sheets

| VALUE | B1 | B2 | B3 |
|---|---|---|---|
| 0 | 0 | 0 | 0 |
| 1 | 1 | 0 | 0 |
| 2 | 0 | 1 | 0 |
| 3 | 1 | 1 | 0 |
| 4 | 0 | 0 | 1 |
| 5 | 1 | 0 | 1 |
| 6 | 0 | 1 | 1 |
| 7 | 1 | 1 | 1 |

PHASE ANGLE MEASUREMENT OF A DIMMING CIRCUIT FOR A SWITCHING POWER SUPPLY

CROSS REFERENCE TO RELATED APPLICATIONS

This application is a continuation of U.S. patent application Ser. No. 12/702,963, filed Feb. 9, 2010, now pending. U.S. patent application Ser. No. 12/702,963 is hereby incorporated by reference.

BACKGROUND OF THE INVENTION

1. Field of the Invention

The present invention relates generally to power supplies, and more specifically to power supplies utilized with dimmer circuits.

2. Discussion of the Related Art

Electronic devices use power to operate. Switched mode power supplies are commonly used due to their high efficiency, small size and low weight to power many of today's electronics. Conventional wall sockets provide a high voltage alternating current. In a switching power supply a high voltage alternating current (ac) input is converted to provide a well regulated direct current (dc) output through an energy transfer element. The switched mode power supply control circuit usually provides output regulation by sensing one or more inputs representative of one or more output quantities and controlling the output in a closed loop. In operation, a switch is utilized to provide the desired output by varying the duty cycle (typically the ratio of the on time of the switch to the total switching period), varying the switching frequency or varying the number of pulses per unit time of the switch in a switched mode power supply.

In one type of dimming for lighting applications, a triac dimmer circuit typically removes a portion of the ac input voltage to limit the amount of voltage and current supplied to an incandescent lamp. This is known as phase dimming because it is often convenient to designate the position of the missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period has 360 degrees, and a half line cycle has 180 degrees. Typically, the phase angle is a measure of how many degrees (from a reference of zero degrees) of each half line cycle the dimmer circuit removes. As such, removal of half the ac input voltage in a half line cycle by the triac dimmer circuit corresponds to a phase angle of 90 degrees. In another example, removal of a quarter of the ac input voltage in a half line cycle may correspond to a phase angle of 45 degrees.

Although phase angle dimming works well with incandescent lamps that receive the altered ac input voltage directly, it typically creates problems for light emitting diode (LED) lamps. LED lamps require a regulated power supply to provide regulated current and voltage from the ac power line. Conventional regulated power supply controllers typically don't respond desirably to a removal of a portion of the ac input voltage by a triac dimmer circuit. Regulated power supplies are typically designed to ignore distortions of the ac input voltage. Their purpose is to deliver a constant regulated output until a low input voltage causes them to shut off completely. As such, conventional regulated power supplies would not dim the LED lamp. Unless a power supply for an LED lamp is specially designed to recognize and respond to the voltage from a triac dimmer circuit in a desirable way, a triac dimmer is likely to produce unacceptable results such as flickering of the LED lamp, flashing of the LED lamp at high phase angles, and color shifting of the LED lamp. Thus, a power supply may include an improved conventional power supply controller that is designed to respond to a triac dimmer circuit by directly sensing the average value of the dimmer circuit output (in other words, the average value of the ac input voltage after the triac dimmer circuit has removed a portion of the ac input voltage) to determine the amount of dimming requested. In general, a smaller average value of the dimmer circuit output would correspond to a removal of a greater portion of the ac input voltage and thus a larger phase angle. As such, the improved conventional power supply controller utilizes this relationship to indirectly determine the phase angle and alter the quantity to which the output of the power supply is regulated. However, by indirectly measuring the phase angle in this manner, the amount of dimming detected (and hence the quantity to which the output of the power supply is regulated) is subject to variances of the ac input voltage. In other words, the accuracy of the phase angle measured through the average value of the dimmer circuit output is dependant on variances of the ac input voltage.

BRIEF DESCRIPTION OF THE DRAWINGS

The above and other aspects, features and advantages of several embodiments of the present invention will be more apparent from the following more particular description thereof, presented in conjunction with the following drawings.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of a controller and power supply for phase angle measurement of a dimming circuit are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

For phase dimming applications, including those for light emitting diodes (LED), a phase dimmer circuit typically removes a portion of the ac input voltage at every half line cycle to limit the amount of voltage and current supplied to the LEDs. As mentioned above, typically, the phase angle is a measure of how many degrees of each half line cycle the dimmer circuit removes. For example, the half line cycle of the ac input voltage may have a total of 180 degrees. As such, removal of half the ac input voltage in a half line cycle by the dimmer circuit corresponds to a phase angle of 90 degrees. In another example, removal of a quarter of the ac input voltage in a half line cycle may correspond to a phase angle of 45 degrees.

For embodiments of the present invention, the phase angle is directly measured through the zero-crossing of the ac input voltage for a more accurate measurement. The zero-crossing generally refers to when the ac input voltage crosses zero voltage. Or in other words, the zero-crossing refers to when the magnitude of the ac input voltage changes from positive to negative or from negative to positive. However, the zero-crossing may also generally refer to when a signal is substantially near zero voltage. Determining the duration of the zero-crossing of the output of the dimmer circuit (in other words the ac input voltage after the dimmer circuit has removed a portion of the ac input voltage) would signal to the power supply controller that a dimmer circuit is being utilized in addition to the amount of dimming applied. In embodiments of the present invention, determining the duration of the zero-crossing of the output dimmer circuit would directly measure the phase angle. As such, the measured phase angle and the amount of dimming detected would be less subject to variances of the ac input voltage.

Figure 1:
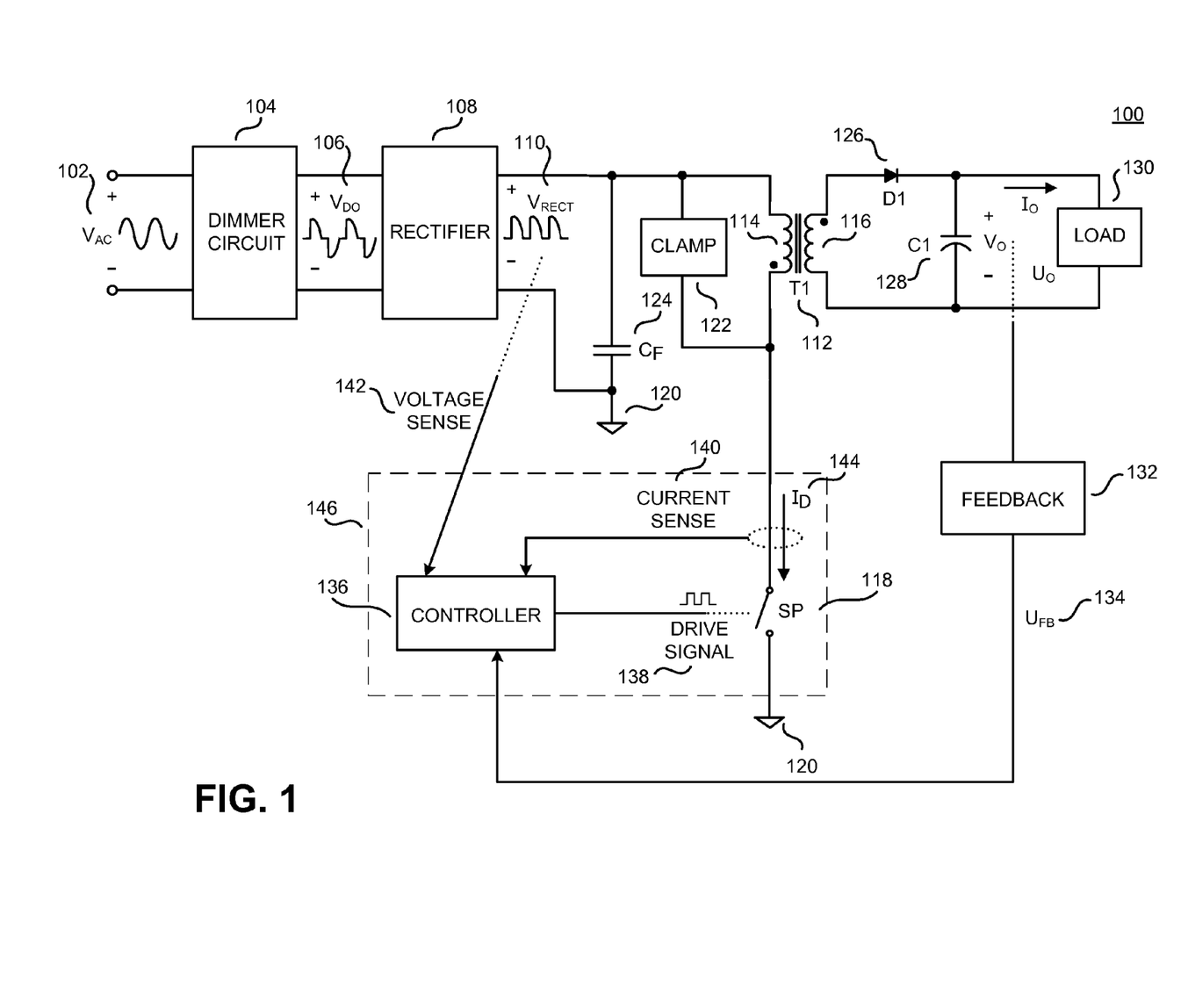
FIG. 1 is a functional block diagram illustrating an example switching power supply with a dimmer circuit utilizing a controller in accordance with an embodiment of the present invention.

Referring first to FIG. 1, a functional block diagram of an example switching power supply 100 is illustrated including ac input voltage $V_{AC}$ 102, a dimmer circuit 104, a dimmer output voltage $V_{DO}$ 106, a rectifier 108, a rectified voltage $V_{RECT}$ 110, an energy transfer element T1 112 with a primary winding 114 and a secondary winding 116, a switch SP 118, an input return 120, a clamp circuit 122, a filter capacitor $C_F$ 124, a rectifier D1 126, an output capacitor C1 128, an output quantity $U_O$, an output voltage $V_O$, an output current $I_O$, a feedback circuit 132, a feedback signal $U_{FB}$ 134, a controller 136, a drive signal 138, a current sense input signal 140, a voltage sense input signal 142, and switch current $I_D$ 144. Also illustrated in FIG. 1 is a load 130 coupled to the output of switching power supply 100. The example switching power supply 100 illustrated in FIG. 1 is configured generally as a flyback regulator, which is one example of a switching power supply topology which may benefit from the teachings of the present invention. However, it is appreciated that other known topologies and configurations of switching power supply regulators may also benefit from the teachings of the present invention.

The switching power supply 100 provides output power to the load 130 from an unregulated input voltage. In one embodiment, the input voltage is the ac input voltage $V_{AC}$ 102. In another embodiment, the input voltage is a rectified ac input voltage such as rectified voltage $V_{RECT}$ 110. As shown, dimmer circuit 104 receives the ac input voltage $V_{AC}$ 102 and produces the dimmer output voltage $V_{DO}$ 106. In one embodiment, the dimmer circuit 104 may be a phase dimming circuit such as a triac phase dimmer. The dimmer circuit 104 further couples to the rectifier 108 and the dimmer output voltage $V_{DO}$ 106 is received by the rectifier 108. The rectifier 108 outputs rectified voltage $V_{RECT}$ 110. In one embodiment, rectifier 108 may be a bridge rectifier. The rectifier 108 further couples to the energy transfer element T1 112. In some embodiments of the present invention, the energy transfer element T1 112 may be a coupled inductor. In other embodiments, the energy transfer element T1 112 may be a transformer. In the example of FIG. 1, the energy transfer element T1 112 includes two windings, a primary winding 114 and a secondary winding 116. However, it should be appreciated that the energy transfer element T1 112 may have more than two windings. The primary winding 114 is further coupled to switch SP 118, which is then further coupled to input return 120. In one embodiment, the switch SP 118 may be a transistor such as a metal-oxide-semiconductor field-effect transistor (MOSFET). In another example, controller 136 may be implemented as a monolithic integrated circuit or may be implemented with discrete electrical components or a combination of discrete and integrated components. Controller 136 and switch SP 118 could form part of an integrated circuit 146 that is manufactured as either a hybrid or monolithic integrated circuit.

In addition, the clamp circuit 122 is illustrated in the embodiment of FIG. 1 as being coupled across the primary winding 114 of the energy transfer element T1 112. The filter capacitor $C_F$ 124 may couple across the primary winding 114 and switch SP 118. In other words, the filter capacitor $C_F$ 124 may couple to the rectifier 108 and input return 120. Secondary winding 116 of the energy transfer element T1 112 is coupled to the rectifier D1 126. In the example of FIG. 1, the rectifier D1 126 is exemplified as a diode. However, in some embodiments the rectifier D1 126 may be a transistor used as a synchronous rectifier. Both the output capacitor C1 128 and the load 130 are shown in FIG. 1 as being coupled to the rectifier D1 126. An output is provided to the load 130 and may be provided as either a regulated output voltage $V_O$, regulated output current $I_O$, or a combination of the two. In one embodiment, the load 130 may be a light emitting diode (LED) array.

The switched mode power supply 100 further comprises circuitry to regulate the output which is exemplified as output quantity $U_O$. In general, the output quantity $U_O$ is either an output voltage $V_O$, output current $I_O$, or a combination of the two. A feedback circuit 132 is coupled to sense the output quantity $U_O$ from the output of the switched mode power supply 100 and produces the feedback signal $U_{FB}$ 134. In other embodiments, the feedback signal $U_{FB}$ may be derived from sensing one or more quantities on the input side of the transformer that are representative of the output quantity $U_O$. The feedback circuit 132 is further coupled to a terminal of the controller 136 such that the controller 136 receives the feedback signal $U_{FB}$ 134. The controller 136 further includes a terminal for receiving the current sense input signal 140. The current sense input signal 140 is representative of the switch current $I_D$ 144 in the switch SP 118. In addition, the switch SP 118 receives the drive signal 138 from the controller 136. In addition, the controller 136 may also include a terminal for receiving the voltage sense input signal 142. In the example of FIG. 1, the voltage sense input signal 142 is representative of the rectified voltage $V_{RECT}$ 110. However, in other embodiments the voltage sense signal 142 may be representative of the dimmer output voltage $V_{DO}$ 106.

In operation, the switching power supply 100 of FIG. 1 provides output power to the load 130 from an unregulated input such as the ac input voltage $V_{AC}$ 102. The dimmer circuit 104 may be utilized when the load 130 of the switching power supply 100 is a LED array to limit the amount of power delivered to the power supply. As a result the current delivered to the load of LED arrays is limited and the LED array dims. As mentioned above, the dimmer circuit 104 may be a phase dimmer circuit such as a triac dimmer circuit. The dimmer circuit 104 disconnects the ac input voltage $V_{AC}$ 102 when the ac input voltage $V_{AC}$ 102 crosses zero voltage. After a given amount of time, the dimmer circuit 104 reconnects the ac input voltage $V_{AC}$ 102 with the power supply 100. In other words, the dimmer circuit 104 may interrupt the phase of the ac input voltage $V_{AC}$ 102. Depending on the amount of dimming wanted the dimmer circuit 104 controls the amount of time the ac input voltage $V_{AC}$ 102 is disconnected from the power supply. In general, the more dimming wanted corresponds to a longer period of time during which the dimming circuit 104 disconnects the ac input voltage $V_{AC}$ 102. As will be further discussed, the phase angle may be determined by measuring the period of time during which the dimming circuit 104 disconnects the ac input voltage $V_{AC}$ 102.

The dimmer circuit 104 produces the dimmer output voltage $V_{DO}$ 106 which is received by rectifier 108. The rectifier 108 produces the rectified voltage $V_{RECT}$ 110. The filter capacitor $C_F$ 124 filters the high frequency current from the switch SP 118. For other applications, the filter capacitor $C_F$ 124 may be large enough such that a substantially dc voltage is applied to the energy transfer element T1 112. However, for power supplies with power factor correction (PFC), a small filter capacitor $C_F$ 124 may be utilized to allow the voltage applied to the energy transfer element T1 112 to substantially follow the rectified voltage $V_{RECT}$ 110. As such, the value of the filter capacitor $C_F$ 124 may be chosen such that the voltage on the filter capacitor $C_F$ 124 reaches substantially zero during each half-line cycle of the ac input voltage $V_{AC}$ 102. Or in other words, the voltage on the filter capacitor $C_F$ 124 substantially follows the positive magnitude of the dimmer output voltage $V_{DO}$ 106. As such, the controller 136 may detect when the dimmer circuit 104 disconnects the ac input voltage $V_{AC}$ 102 from the power supply 100 by sensing the voltage on the filter capacitor $C_F$ 124 (or in other words the rectified voltage $V_{RECT}$ 110). In another embodiment, the controller 136 may detect when the dimmer circuit 104 disconnects the ac input voltage $V_{AC}$ 102 from the power supply 100 by sensing the switch current $I_D$ 144.

The switching power supply 100 utilizes the energy transfer element T1 112 to transfer voltage between the primary 114 and the secondary 116 windings. The clamp circuit 122 is coupled to the primary winding 114 to limit the maximum voltage on the switch SP 118. Switch SP 118 is opened and closed in response to the drive signal 138. It is generally understood that a switch that is closed may conduct current and is considered on, while a switch that is open cannot conduct current and is considered off. In some embodiments, the switch SP 118 may be a transistor and the switch SP 118 and the controller 136 may form part of integrated circuit 146. In operation, the switching of the switch SP 118 produces a pulsating current at the rectifier D1 126. The current in the rectifier D1 126 is filtered by the output capacitor C1 128 to produce a substantially constant output voltage $V_O$, output current $I_O$, or a combination of the two at the load 130.

The feedback circuit 132 senses the output quantity $U_O$ of the power supply 100 to provide the feedback signal $U_{FB}$ 134 to the controller 136. The feedback signal $U_{FB}$ 134 may be a voltage signal or a current signal and provides information regarding the output quantity $U_O$ to the controller 136. In addition, the controller 136 receives the current sense input signal 140 which relays the switch current $I_D$ 144 in the switch SP 118. The switch current $I_D$ 144 may be sensed in a variety of ways, such as for example the voltage across a discrete resistor or the voltage across a transistor when the transistor is conducting. In addition, the controller 136 may receive the voltage sense input signal 142 which relays the value of the rectified voltage $V_{RECT}$ 110. The rectified voltage $V_{RECT}$ 110 may be sensed a variety of ways, such as for example through a resistor divider.

The controller 136 may determine the phase angle by utilizing the switch current $I_D$ 144 provided by the current sense input signal 140, or the rectified voltage $V_{RECT}$ 110 provided by the voltage sense input signal 142 or a combination of the two. For example, the controller 136 measures the length of time during which the dimmer circuit 104 disconnects the ac input voltage $V_{AC}$ 102 from the power supply 100. In other words, the controller 136 measures the length of time during which the dimmer output voltage $V_{DO}$ 106 and the rectified voltage $V_{RECT}$ 110 are substantially equal to zero voltage. To measure the phase angle, the controller 136 divides the length of time during which the dimmer output voltage $V_{DO}$ 106 and the rectified voltage $V_{RECT}$ 110 are substantially equal to zero voltage by the length of time of the half line cycle. As will be further discussed, the controller 136 determines when the dimmer output voltage $V_{DO}$ 106 and the rectified voltage $V_{RECT}$ 110 are substantially equal to zero voltage by determining when the rectified voltage $V_{RECT}$ 110 is less than a threshold voltage $V_{TH}$. In addition, the controller 136 may utilize a counter to measure the length of time during which the rectified voltage $V_{RECT}$ 110 is less than a threshold voltage $V_{TH}$.

The controller 136 outputs a drive signal 138 to operate the switch SP 118 in response to various system inputs to substantially regulate the output quantity $U_O$ to the desired value. In one embodiment, the drive signal 138 may be a rectangular pulse waveform with varying lengths of logic high and logic low sections, with the logic high value corresponding to a closed switch and a logic low corresponding to an open switch. In another embodiment, the drive signal may be comprised of substantially fixed-length logic high (or ON) pulses and regulated by varying the number of ON pulses per number of oscillator cycles.

Figure 2A:
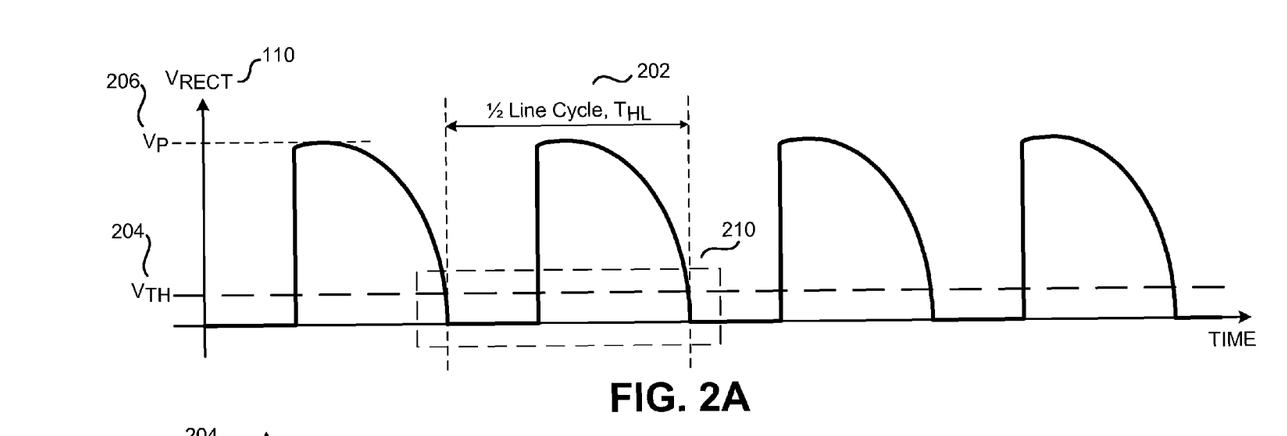
FIG. 2A is a diagram illustrating an example rectified input voltage waveform of the switching power supply of FIG. 1 in accordance with an embodiment of the present invention.
Figure 2B:
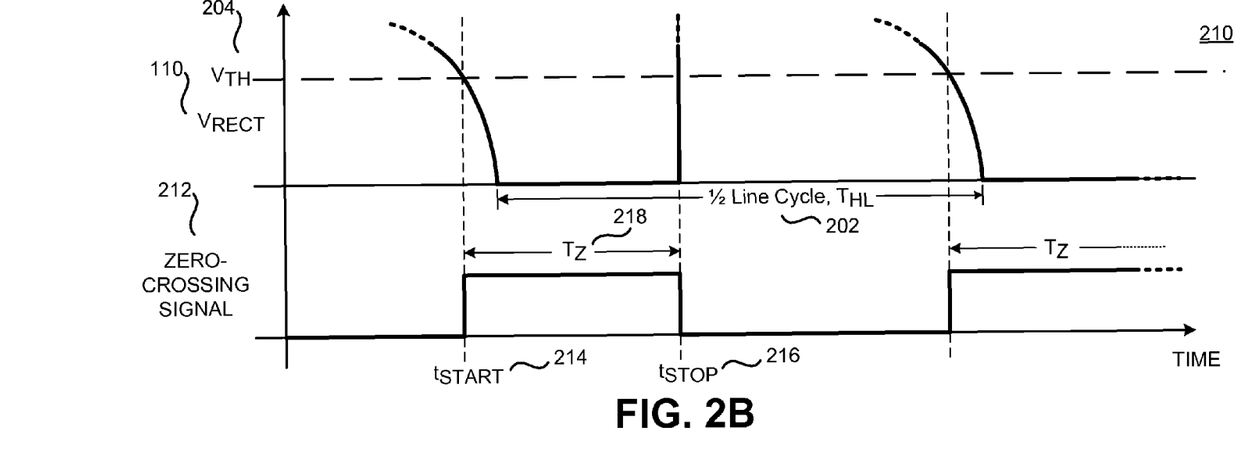
FIG. 2B is a diagram illustrating a section of the example rectified input voltage of FIG. 2A and corresponding zero-crossing signal in accordance with an embodiment of the present invention.

Referring next to FIG. 2A, a diagram of an example waveform of the rectified voltage $V_{RECT}$ 110 of the switching power supply 100 is illustrated including half line cycle $T_{HL}$ 202, a threshold voltage $V_{TH}$ 204, a peak voltage $V_P$ 206, and a section 210. FIG. 2B illustrates the section 210 and corresponding zero-crossing signal 212. The controller utilizes the zero-crossing signal 212 to measure the phase angle and subsequently alter the quantity to which the output of the power supply is regulated.

In general, the ac input voltage $V_{AC}$ 102 is a sinusoidal waveform with the period of the ac input voltage $V_{AC}$ 102 referred to as a full line cycle. Mathematically: $V_{AC} = V_P \sin(2\pi f_L t)$. Where $V_P$ 206 is the peak voltage of the ac input voltage $V_{AC}$ 102 and $f_L$ is the frequency of the line input voltage. Or in other words, $f_L$ is the frequency of the ac input voltage $V_{AC}$ 102. It should be appreciated that the full line cycle is the reciprocal of the line frequency $f_L$, or mathematically: full line cycle=$1/f_L$. Further, the half line cycle $T_{HL}$ 202 is the reciprocal of double the line frequency, or mathematically:

$$T_{HL} = \frac{1}{2f_L}.$$

The rectified voltage $V_{RECT}$ 110 is the resultant output of the rectifier 108 and the dimming circuit 104. For the example of FIG. 2A, the beginning of each half line cycle $T_{HL}$ 202 of the rectified voltage $V_{RECT}$ 110 is substantially equal to zero voltage corresponding to when the dimmer circuit 104 disconnects the ac input voltage $V_{AC}$ 102 from the power supply. When the dimmer circuit 104 reconnects the ac input voltage $V_{AC}$ 102 to the power supply, the rectified voltage $V_{RECT}$ 110 substantially follows the positive magnitude of the ac input voltage $V_{AC}$ 102. Or mathematically: $V_{RECT} = |V_{DO}|$.

For some embodiments the threshold voltage $V_{TH}$ 204 is substantially equal to zero. For other embodiments, the threshold voltage $V_{TH}$ 204 is substantially one fifth of the peak voltage $V_P$ 206 of the rectified voltage $V_{RECT}$ 110. In one example, if the peak voltage $V_P$ 206 of the rectified voltage $V_{RECT}$ 110 is substantially equal to 125 V, the threshold voltage $V_{TH}$ 204 is substantially equal to 25 V. In another embodiment, the threshold voltage $V_{TH}$ 204 is substantially one fourth of the peak voltage $V_P$ 206 of the rectified voltage $V_{RECT}$ 110. It should be appreciated that as the value of the threshold voltage $V_{TH}$ 204 is closer to zero voltage, the more accurate the zero-crossing signal 212 indicates that the rectified voltage $V_{RECT}$ 110 is substantially equal to zero. However, the closer the value of the rectified voltage $V_{RECT}$ 110 is to zero voltage the more difficult it may be for embodiments of controller 136 to sense the value of the rectified voltage $V_{RECT}$ 110. In particular, the controller 136 may have some difficulty sensing the value of the rectified voltage $V_{RECT}$ 110 through the switch current $I_D$ 144 provided by the current sense signal 140 when the rectified voltage $V_{RECT}$ 110 is at or near zero voltage. As such embodiments of controller 136 may have a non-zero threshold voltage $V_{TH}$ 204 to allow the sensing of the zero-voltage condition when the value of the rectified voltage $V_{RECT}$ 110 is at or near zero voltage. In addition, the rectified voltage $V_{RECT}$ 110 may not reach zero due in part to the selected value of the filter capacitor $C_F$ 124.

FIG. 2B illustrates the section 210 of the rectified voltage $V_{RECT}$ 110 and the corresponding zero-crossing signal 212. Embodiments of the present invention utilize the zero-crossing signal 212 to determine the phase angle and subsequently the amount of dimming for the power supply 100. When the rectified voltage $V_{RECT}$ 110 is less than the threshold voltage $V_{TH}$ 204, the zero-crossing signal 212 is in a state which indicates that the rectified voltage $V_{RECT}$ 110 is less than the threshold voltage $V_{TH}$ 204. The zero-crossing signal 212 is a rectangular pulse waveform with logic high and logic low sections. For the example illustrated in FIG. 2B, when the rectified voltage $V_{RECT}$ 110 is less than the threshold voltage $V_{TH}$ 204, the value of the zero-crossing signal 212 is logic high. When the rectified voltage $V_{RECT}$ 110 is greater than threshold voltage $V_{TH}$ 204, the value of the zero-crossing signal 212 is logic low. As mentioned above, the rectified voltage $V_{RECT}$ 110 follows the positive magnitude of the ac input voltage $V_{AC}$ 102 once the dimmer circuit 104 reconnects the ac input voltage $V_{AC}$ 102 to the power supply 100. As such, determining when the rectified voltage $V_{RECT}$ 110 is near zero voltage would correspond to detecting when the ac input voltage $V_{AC}$ 102 crosses zero voltage, hence the term "zero-crossing."

However, since the dimmer circuit 104 disconnects the ac input voltage $V_{AC}$ 102 from the power supply, subsequent portions of the rectified voltage $V_{RECT}$ 110 are substantially equal to zero. As such, the zero-crossing signal 212 is in a state which indicates that the rectified voltage $V_{RECT}$ 110 is less than the threshold voltage $V_{TH}$ 204. For the example shown in FIG. 2B, the zero-crossing signal 212 would be a logic high value. The phase angle is a measure of how many degrees of each half line cycle $T_{HL}$ 202 the dimmer circuit removes from the ac input voltage $V_{AC}$ 102. Therefore by measuring the length of time during which the zero-crossing signal 212 is in a state which indicates that the rectified voltage $V_{RECT}$ 110 is less than the threshold voltage $V_{TH}$ 204 (i.e. logic high in the example) the controller 136 may measure the phase angle. For FIG. 2B, the length of time during which the zero-crossing signal is at the logic high value is denoted by $T_Z$ 218, herein referred to as the zero-crossing pulse width $T_Z$ 218. In accordance with embodiments of the present invention, the phase angle (expressed in degrees) may be calculated by dividing the zero-crossing pulse width $T_Z$ 218 by the half line cycle $T_{HL}$ 202, or mathematically:

$$\text{phase angle(expressed in degrees)} = \frac{T_Z}{T_{HL}}(180).$$

As mentioned above, typical dimming systems determine the amount of dimming by measuring the average value of the ac input voltage after the dimmer circuit has removed a portion of the ac input voltage. A smaller average value of the dimmer circuit output would correspond to a larger phase angle. As such, the typical controller utilizes this relationship to indirectly determine the phase angle and alter the quantity which the output of the power supply is regulated to. However, by indirectly measuring the phase angle in this manner, the amount of dimming detected (and hence the quantity which the output of the power supply is regulated to) would be subject to variances of the ac input voltage. In other words, the accuracy of the phase angle measured through the average value of the dimmer circuit output would be dependant on variances of the ac input voltage. By counting the length of the zero-crossing pulse width $T_Z$ 218 and comparing it to the half line cycle $T_{HL}$ 202, the controller 136 may calculate the phase angle of the dimmer circuit 104 and determine the amount of dimming needed independent of the shape of the ac input voltage $V_{AC}$ 102 and independent of variations in the ac input voltage $V_{AC}$ 102. As such, the controller 136 may more accurately determine the phase angle and the amount of dimming and the measured phase angle would be less subject to variances of the ac input voltage.

The amount of dimming wanted corresponds to the length of time during which the dimmer circuit 104 disconnects the ac input voltage $V_{AC}$ 102 from the power supply. It should be appreciated that the dimmer circuit 104 also includes an input (not shown) which provides the dimmer circuit 104 with information regarding the amount of dimming wanted. The longer the dimmer circuit 104 disconnects the ac input voltage $V_{AC}$ 102 from the power supply, the longer the rectified voltage $V_{RECT}$ 110 is substantially equal to zero voltage. As a result, the length of the zero-crossing pulse width $T_Z$ 218 corresponds to the amount of dimming provided by the dimmer circuit 104 and the corresponding phase angle.

Figure 4:
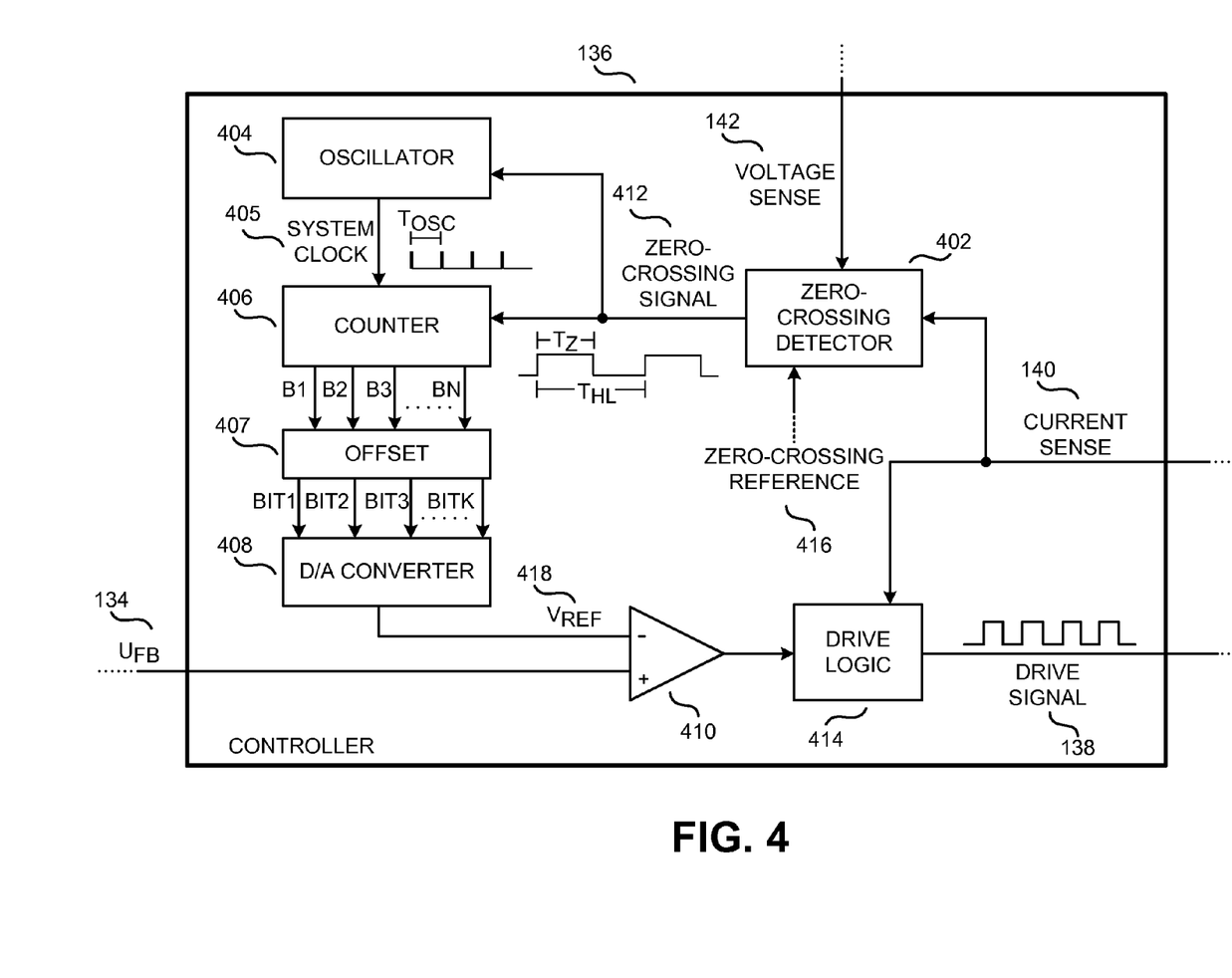
FIG. 4 is a functional block diagram of a controller in accordance with an embodiment of the present invention.
Figure 5:
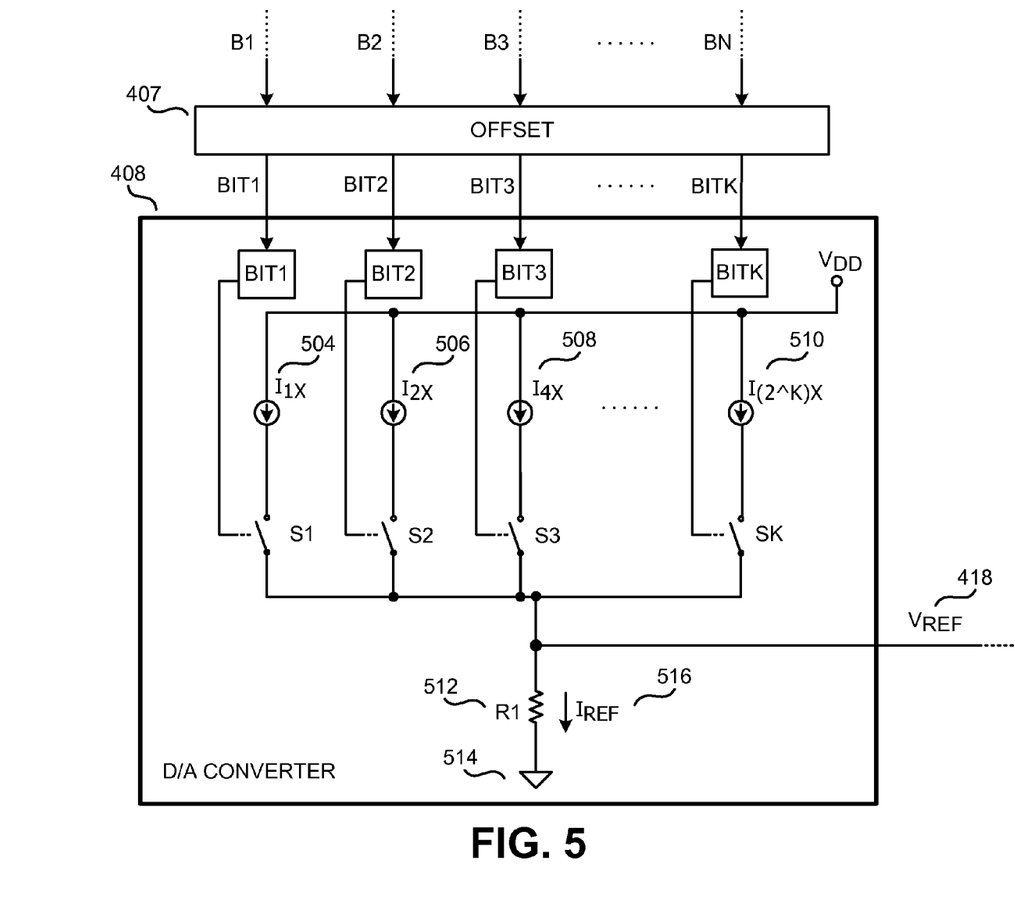
FIG. 5 is a functional block diagram of a digital to analog converter of FIG. 4 in accordance with an embodiment of the present invention.

As will be further discussed, the controller 136 uses a counter to determine the length of the zero-crossing pulse width $T_Z$ 218. The counter starts counting when the zero-crossing signal 212 pulses to the logic high value, indicated in FIG. 2B by start time $t_{START}$ 214. The counter stops counting when the zero-crossing signal 212 pulses to the logic low value, indicated in FIG. 2B by stop time $t_{STOP}$ 216. The count at stop time $t_{STOP}$ 216 which is outputted from the counter is one example of the measurement of the length of the zero-crossing pulse width $T_Z$ 218. In one embodiment of the present invention, the counter may continue counting for the length of half line cycle $T_{HL}$ 202 and the controller may determine the phase angle. In another embodiment of the present invention, the controller 136 utilizes a fixed count for the half line cycle $T_{HL}$ 202. For example, the controller 136 may fix the total count for the half line cycle $T_{HL}$ 202 to 320 counts. When the total count for the half line cycle $T_{HL}$ 202 is fixed, each possible degree of the phase angle would be fixed to a specific count of the zero-crossing pulse width $T_Z$ 218. The total count per half line cycle $T_{HL}$ 202 may be chosen such that the percentage error per count is within acceptable tolerance levels. The greater the total count per half line cycle $T_{HL}$ 202, the smaller the percentage error per count, or mathematically:

$$\text{error per count(expressed as a percentage)} = \frac{1}{M}(100),$$

where M is the total count for the half line cycle $T_{HL}$ 202. If the total count for the half line cycle $T_{HL}$ 202 is equal to 100 the percentage error per count would be 1%. If the total count for the half line cycle $T_{HL}$ 202 is equal to 320 counts, the percentage error per count would be 0.31%. As will be discussed further, FIGS. 4 and 5 illustrate how the controller 136 determines the phase angle and uses the determined phase angle to facilitate dimming.

Figure 3A:
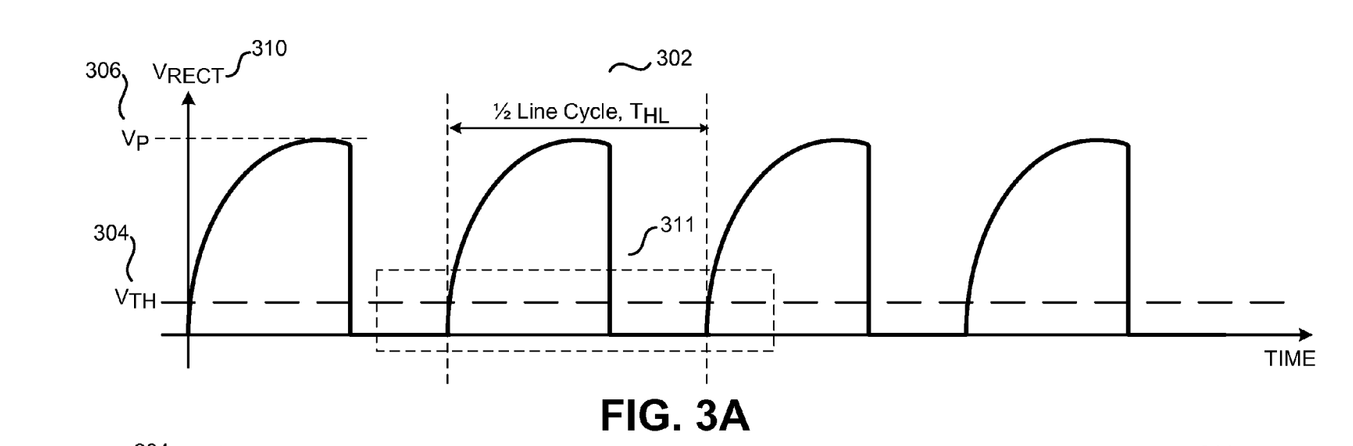
FIG. 3A is a diagram illustrating another example rectified input voltage waveform of a switching power supply in accordance with an embodiment of the present invention.
Figure 3B:
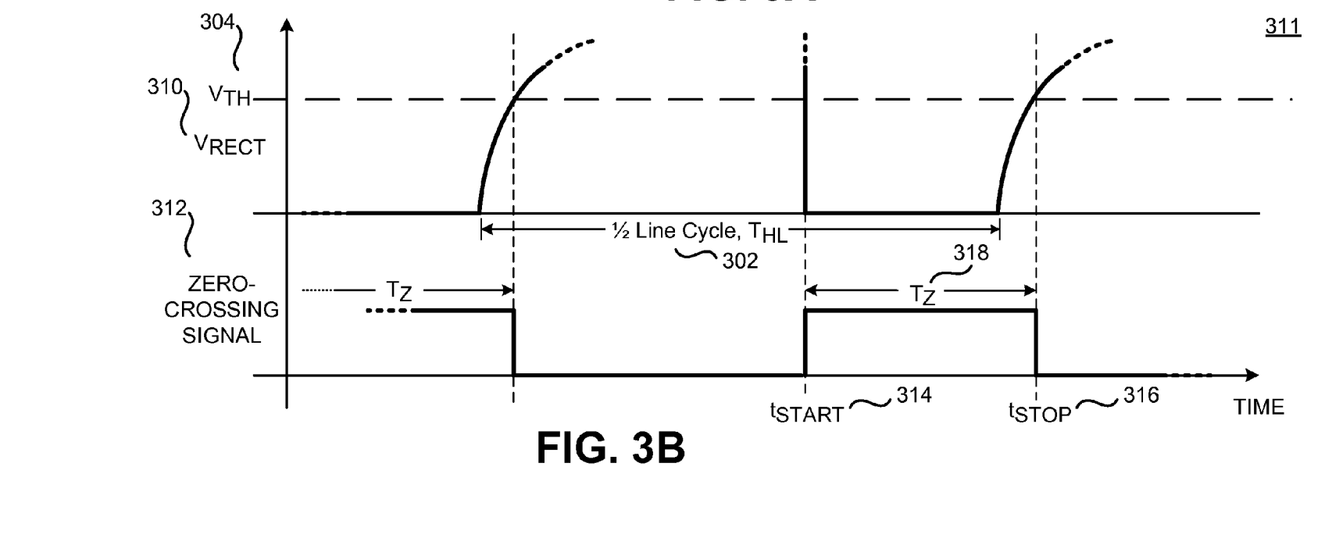
FIG. 3B is a diagram illustrating a section of the example rectified input voltage of FIG. 3A and corresponding zero-crossing signal in accordance with an embodiment of the present invention.

Referring next to FIG. 3A, another example waveform of the rectified voltage $V_{RECT}$ 310 is illustrated including half line cycle $T_{HL}$ 302, threshold voltage $V_{TH}$ 304, peak voltage $V_P$ 306, and section 311. FIG. 3B illustrates the section 311 of the rectified voltage $V_{RECT}$ 310 and the corresponding zero-crossing signal 312. The half line cycle $T_{HL}$ 302, threshold voltage $V_{TH}$ 304, and the peak voltage $V_P$ 306 may be further examples of the half line cycle $T_{HL}$ 202, threshold voltage $V_{TH}$ 204, and the peak voltage $V_P$ 206 shown in FIGS. 2A and 2B.

The example waveform of the rectified voltage $V_{RECT}$ 310 is similar to the rectified voltage $V_{RECT}$ 110 shown in FIG. 2A. In the example of FIG. 2A, the rectified voltage $V_{RECT}$ 110 is the result of the dimmer circuit 104, such as a triac dimmer, which disconnects the ac input voltage $V_{AC}$ 102 at the beginning of every half line cycle $T_{HL}$ 202. However, the rectified voltage $V_{RECT}$ 310 illustrated in FIGS. 3A and 3B is a result of a dimmer circuit 104 which disconnects the ac input voltage $V_{AC}$ 102 at the end of every half line cycle $T_{HL}$ 302. As a result, the rectified voltage $V_{RECT}$ 310 is substantially equal to zero voltage at the end of the half line cycle $T_{HL}$ 302. At the beginning of the half line cycle $T_{HL}$ 302, the rectified voltage $V_{RECT}$ 310 substantially follows the positive magnitude of the ac input voltage $V_{AC}$ 102 until the dimmer circuit 104 disconnects the ac input voltage $V_{AC}$ 102 from the power supply 100. The value of the rectified voltage $V_{RECT}$ 310 then falls to substantially zero voltage until the beginning of the next half line cycle.

FIG. 3B illustrates the section 311 of the rectified voltage $V_{RECT}$ 310 and the corresponding zero-crossing signal 312. Embodiments of the present invention utilize the zero-crossing signal 312 to determine the phase angle and subsequently the amount of dimming for the power supply 100. When the rectified voltage $V_{RECT}$ 310 is less than the threshold voltage $V_{TH}$ 304, the zero-crossing signal 312 indicates that the zero-crossing condition exists. For the example of FIG. 3B, when the rectified voltage $V_{RECT}$ 310 is less than the threshold voltage $V_{TH}$ 304, the value of the zero-crossing signal 312 is at a logic high value. When the rectified voltage $V_{RECT}$ 310 is greater than the threshold voltage $V_{TH}$ 304, the value of the zero-crossing signal 312 is at the logic low value.

As mentioned above, the length of time during which the zero-crossing signal 312 is at the logic high value indicating the zero-crossing condition exists is referred to as the zero-crossing pulse width $T_Z$ 318. The length of the zero-crossing pulse width $T_Z$ 318 is utilized to measure the phase angle and the amount of dimming indicated by dimmer circuit 104. In accordance with embodiments of the present invention, the phase angle may be calculated by comparing the zero-crossing pulse width $T_Z$ 318 with the half line cycle $T_{HL}$ 302, or mathematically:

$$\text{phase angle(expressed in degrees)} = \frac{T_Z}{T_{HL}}(180).$$

By counting the length of the zero-crossing pulse width $T_Z$ 318 and comparing the zero-crossing pulse width $T_Z$ 318 to the length of the half line cycle $T_{HL}$ 302, the controller 136 may calculate the phase angle of the dimmer circuit 104 and determine the amount of dimming needed independent of the shape of the ac input voltage $V_{AC}$ 102 and independent of variations in the ac input voltage $V_{AC}$ 102.

The controller 136 may use a counter to determine the length of the zero-crossing pulse width $T_Z$ 318. The counter starts counting when the zero-crossing signal 312 pulses to the logic high value, indicated in FIG. 3B by start time $t_{START}$ 314. The counter stops counting when the zero-crossing signal 312 pulses to the logic low value, indicated in FIG. 3B by stop time $t_{STOP}$ 316. The count at stop time $t_{STOP}$ 316 which is outputted from the counter is one example of the measurement of the zero-crossing pulse width $T_Z$ 318. In one embodiment of the present invention, the counter may continue counting for the length of half line cycle $T_{HL}$ 302 and the controller may compare the count of the zero-crossing pulse width $T_Z$ 318 with the count of the half line cycle $T_{HL}$ 302 to determine the phase angle. In another embodiment of the present invention, the controller 136 utilizes a fixed count for the half line cycle $T_{HL}$ 302. For example, the controller 136 may fix the total count for the half line cycle $T_{HL}$ 302 to 320 counts. When the total count for the half line cycle $T_{HL}$ 302 is fixed, each possible degree of the phase angle would be fixed to a specific count of the zero-crossing pulse width $T_Z$ 318. The total count per half line cycle $T_{HL}$ 302 may be chosen such that the percentage error per count is within acceptable tolerance levels. The greater the total count per half line cycle $T_{HL}$ 302, the smaller the percentage error per count, or mathematically:

$$\text{error per count(expressed as a percentage)} = \frac{1}{M}(100),$$

where M is the total count for the half line cycle $T_{HL}$ 302. If the total count for the half line cycle $T_{HL}$ 302 is equal to 100 the percentage error per count would be 1%. If the total count for the half line cycle $T_{HL}$ 302 is equal to 320 counts, the percentage error per count would be 0.31%. As will be discussed further, FIGS. 4 and 5 illustrate how the controller 136 determines the phase angle and uses the determined phase angle to facilitate dimming.

Referring next to FIG. 4, a functional block diagram of a controller 136 is illustrated including feedback signal $U_{FB}$ 134, drive signal 138, current sense input signal 140, voltage sense input signal 142, a zero-crossing detector 402, an oscillator 404, a system clock signal 405, a counter 406, an optional offset block 407, a digital-to-analog converter 408 (D/A converter 408), an amplifier 410, a zero-crossing signal 412, a drive logic block 414 (i.e., a drive signal generator), a zero-crossing reference 416, and a reference voltage 418. The zero-crossing signal 412 is one example of the zero-crossing signal illustrated in FIGS. 2B and 3B. FIG. 4 illustrates how the controller 136 measures the phase angle and utilizes the phase angle to change the reference voltage 418 to facilitate dimming of the output of the power supply 100.

The feedback signal $U_{FB}$ 134, drive signal 138, current sense input signal 140, and voltage sense input signal 142 couple and function as described above. The controller 136 further includes the zero-crossing detector 402 which couples to and receives the current sense input signal 140 and the zero-crossing reference 416. The zero-crossing detector 402 may also receive the voltage sense input signal 142. The zero-crossing reference 416 represents the threshold voltage $V_{TH}$ (as discussed as threshold voltage $V_{TH}$ 204 and 304) and the zero-crossing detector 402 outputs the zero-crossing signal 412. As mentioned above, the zero-crossing signal 412 indicates when the zero-crossing condition exists, or in other words when the rectified voltage $V_{RECT}$ 110 falls below the threshold voltage $V_{TH}$. The zero-crossing signal 412 is a rectangular pulse waveform with varying lengths of logic high and logic low sections. The length between consecutive rising edges of the zero-crossing signal 412 is substantially equal to the half line cycle $T_{HL}$. In addition, the length of time of the logic high sections is substantially equal to zero-crossing pulse width $T_Z$. In one embodiment, the zero-crossing detector 402 receives information regarding the rectified voltage $V_{RECT}$ 110 from the voltage sense signal 142 and the zero-crossing detector 402 generates the zero-crossing signal utilizing the voltage sense signal 142 and the zero-crossing reference 416. In another embodiment, the zero-crossing detector 402 receives information regarding the rectified voltage $V_{RECT}$ 110 from the switch current $I_D$ 144 provided by the current sense signal 140 and the zero-crossing detector 402 generates the zero-crossing signal utilizing the current sense signal 140 and the zero-crossing reference 416. In a further embodiment, the zero-crossing detector 402 receives information regarding the rectified voltage $V_{RECT}$ 110 from both the voltage sense signal 142 and the current sense signal 140 and generates the zero-crossing signal utilizing the current sense signal 140, voltage sense signal 142 and the zero-crossing reference 416.

The relationship between voltage and current of the switch SP 118 when the switch SP 118 is ON may be expressed as:

$$V(t) = L_P \frac{di(t)}{dt},$$

where $L_P$ is the inductance of the primary winding 114. For power supplies operating in discontinuous conduction mode (DCM), this relationship during any switching cycle may be further expressed as:

$$V_{AC} = L_P \frac{I_{PEAK}}{t_{ON}},$$

where $I_{PEAK}$ is the peak value of the switch current $I_D$ 144 and $t_{ON}$ is the on-time of the switch SP 118. However, in one switching cycle the value of $V_{AC}$ may be considered a constant since the on-time $t_{ON}$ is small relative to the half line cycle $T_{HL}$. For the example shown in FIG. 1, $$V_{RECT} = L_P \frac{I_{PEAK}}{t_{ON}},$$

as such the zero-crossing detector 402 may determine the value of the rectified voltage $V_{RECT}$ 110 from the switch current $I_D$ 144. The controller 136 may fix a zero-crossing current threshold $I_{ZC}$ and the zero-crossing time threshold $t_{CZ}$ to correspond to the threshold voltage $V_{TH}$ (204 and 304) utilizing the relationship between voltage and current of the switch SP 118 when the switch SP 118 is ON in DCM, or mathematically:

$$V_{TH} = L_P \frac{I_{ZC}}{t_{ZC}}.$$

The zero-crossing detector 402 may determine that the rectified voltage $V_{RECT}$ 110 is less than the threshold voltage $V_{TH}$ (204 and 304) by determining when the peak value of the switch current $I_D$ 144 is less than the zero-crossing current threshold $I_{ZC}$. For one embodiment, the zero-crossing current threshold $I_{ZC}$ is one example of the zero-crossing reference 416.

The zero-crossing detector 402 couples to the counter 406 and the counter 406 receives the zero-crossing signal 412. In addition, the counter 406 couples to the oscillator 404 and receives a system clock signal 405 from the oscillator 404. In one embodiment, the oscillator 404 is a line-synchronized oscillator, an example of which is described in more detail with regard to FIG. 7 below. In one embodiment, the system clock signal 405 is a rectangular pulse waveform with varying lengths of logic high and logic low sections. The length of time between consecutive rising edges is substantially equal to the oscillator period $T_{OSC}$. The oscillator frequency $f_{OSC}$ may be chosen to be a multiple of the half line frequency $f_{HL}$, or mathematically: $f_{OSC} = Mf_{HL} > 1$, where M is a positive integer. In other words, the half line cycle $T_{HL}$ ($T_{HL} = 1/f_{HL}$) is a multiple of the oscillator period, $T_{OSC}$ ($T_{OSC} = 1/f_{OSC}$), or mathematically:

$$T_{OSC} = \frac{1}{M} T_{HL}, M > 1.$$

As mentioned above, the value of M also refers to the total count per half line cycle $T_{HL}$. For one embodiment of the present invention, the value of M is 320. In one embodiment, the oscillator 404 further couples to the zero-crossing detector 402 and receives the zero-crossing signal 412. As will be further discussed, the oscillator 404 may utilize the zero-crossing signal 412 to determine the half line cycle $T_{HL}$, or in other words the half line frequency $f_{HL}$. When the oscillator 404 is a line-synchronized oscillator, the oscillator 404 may adjust the oscillator frequency $f_{OSC}$ such that the value of M is substantially constant.

The counter 406 is a binary counter which increments in response to the system clock signal 405 received from the oscillator 404. Or in other words, the counter 406 is a binary counter which increments at every cycle of the oscillator 404. The counter 406 begins counting at the rising edge of the zero-crossing signal 412 (shown as start time $t_{START}$ 214 and 314 with respect to FIGS. 2B and 3B) and the counter 406 continues to count for the length of the zero-crossing pulse width $T_Z$. In one embodiment, the counter 406 then stops counting at the next falling edge of the zero-crossing signal (shown as stop time $t_{STOP}$ 216 and 316 with respect to FIGS. 2B and 3B). The internal count of the counter 406 is then outputted to the offset block 407 as bits B1 through BN. Bits B1 through BN are herein referred to as the phase count. In one example, B1 is the least significant bit (LSB) and BN is the most significant bit (MSB). In one embodiment, the counter 406 resets back to zero at the falling edge of the zero-crossing signal 412. In another embodiment, the counter 406 begins counting at the rising edge of the zero-crossing signal 412 and the counter 406 continues to count for the length of the zero-crossing pulse width $T_Z$. At the next falling edge, the counter 406 forwards the internal count to the offset block 407 as bits B1 through BN, herein referred to as the phase count. However, the counter 406 does not reset its internal count until the next rising edge of the zero-crossing signal 412. In one embodiment, the counter 406 is a plurality of flip-flops arranged to form an asynchronous counter or a synchronous counter. In accordance with embodiments of the present invention, the phase count (B1 through BN) outputted from counter 406 is representative of the phase angle. Specifically, the phase count (B1 through BN) outputted from counter 406 is representative of the phase angle when the total count of every half line cycle $T_{HL}$ is fixed. Or in other words, the phase count (B1 through BN) outputted from counter 406 is representative of the phase angle when $$T_{OSC} = \frac{1}{M} T_{HL}$$

and M is substantially constant. In one embodiment, the total count for every half line cycle $T_{HL}$ is set to 320 counts. Or in other words, M is equal to 320. In one example, a 90 degree phase angle, corresponding to the dimmer circuit 104 disconnecting the ac input voltage VAC 102 for half of the half line cycle $T_{HL}$, would correspond to the counter 406 counting to a phase count of 160. In another example, a 45 degree phase angle, corresponding to the dimmer circuit 104 disconnecting the ac input voltage VAC 102 for a quarter of the half line cycle $T_{HL}$, would correspond to the counter 406 counting to a phase count of 80.

Figure 6:
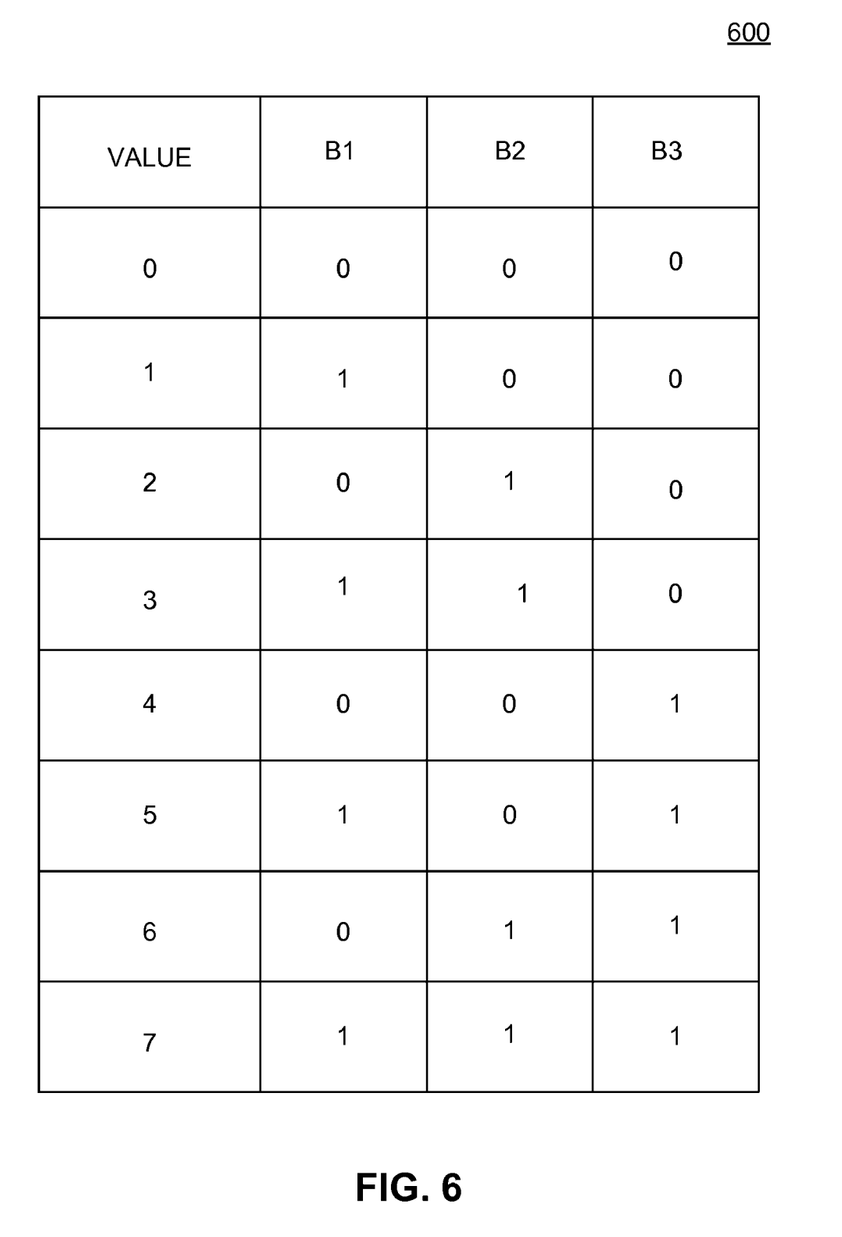
FIG. 6 is a table illustrating example counts of a counter of FIG. 4.

FIG. 6 is a table 600 illustrating example counts of counter 406. As mentioned above, the counter 406 increments at every cycle of the system clock signal 405 when the zero-crossing signal 412 is at the logic high value. For an internal count value of 0, bits B1, B2 and B3 are a logic low value. For an internal count value of 1, bit B1 is at the logic high value while bits B2 and B3 remain at the logic low value. For an internal count of value 7, bits B1, B2 and B3 are at the logic high value. Table 600 illustrates a 3-bit counter, however it should be appreciated any number of bits may be included in counter 406.

Referring back to FIG. 4, counter 406 couples to the optional offset block 407 and the offset block 407 receives the phase count (B1 through BN). The offset block 407 provides an offset amount such that when the phase count (B1 through BN) is less than the offset amount, the controller 136 does not detect dimming and the reference voltage $V_{REF}$ 418 remains at the same value. When the phase count (B1 through BN) is greater than the offset amount, the controller does detect dimming and the reference voltage $V_{REF}$ 418 decreases as the phase count (B1 through BN) increases. The offset block 407 receives the phase count (B1 through BN) and outputs an offset phase count (BIT1 through BITK). When the phase count (B1 through BN) is less than the offset amount, the offset block 407 outputs a binary output substantially equal to zero. Or in other words the offset phase count (BIT1 through BITK) is substantially equal to zero. When the phase count (B1 through BN) is greater than the offset amount, the output of the offset block 407 is the binary value of the offset amount subtracted from the phase count (B1 through BN). In other words, the offset phase count (BIT1 through BITK) is substantially equal to the offset amount subtracted from the phase count (B1 through BN). In one embodiment of the invention, the offset amount may be 64. As discussed above, in one embodiment the controller 136 sets the total count of the half line cycle $T_{HL}$ to be equal to 320 (M=320). Utilizing 320 as the total count, and an offset amount of 64, controller 136 does not detect dimming for a phase angle less than 36 degrees (phase angle=(64/320)(180 degrees)). In one embodiment, 320 may be chosen for the total count when the counter 406 is a binary counter since 64 (offset amount) plus 256 is equal to 320. In one embodiment, the counter 406 may utilize an eight bit binary counter which may count to 256 (since $2^8$=256) and 64 (since $2^6$=64).

The offset amount partially correlates to the offset which occurs when the threshold voltage $V_{TH}$ (shown as threshold voltage $V_{TH}$ 204 and 304 in FIGS. 2B and 3B) is a positive non-zero value. In other words, the zero-crossing pulse width $T_Z$ 218 has a minimum length due to the value of the threshold voltage $V_{TH}$ and as such the controller 136 does not detect any dimming until the dimmer circuit 104 disconnects the ac input voltage $V_{AC}$ 102 for a length of time longer than the minimum length of the zero-crossing pulse width $T_Z$. In other words, the offset amount in offset block 407 partially corresponds to the minimum length of the zero-crossing pulse width $T_Z$. In the example where the offset is 64, the minimum length of the zero-crossing pulse width $T_Z$ corresponds to the counter 406 counting to 64. In addition, the offset amount may be chosen to account for any sudden variance in the ac input voltage $V_{AC}$ 102 which could lead to a false detection of dimming.

The offset block 407 couples to the D/A converter 408 and the D/A converter 408 receives the offset phase count (BIT1 through BITK). As will be further illustrated, the D/A converter 408 converts the received offset phase count (BIT1 through BITK) into reference voltage $V_{REF}$ 418. In one embodiment, the higher the offset phase count (BIT1 through BITK) the lower the reference voltage $V_{REF}$ 418. When the controller 136 does not utilize the offset block 407, the D/A converter 408 converts the phase count (B1 through BN) into reference voltage $V_{REF}$ 418. In one embodiment of the present invention, the offset block 407 may be integrated with the counter 406. In another embodiment of the present invention, the offset block 407 may be integrated with the D/A converter 407.

The D/A converter 408 further couples to a feedback reference circuit, also referred to as amplifier 410, such that the amplifier 410 receives the reference voltage $V_{REF}$ 418. The amplifier 410 also receives the feedback signal $U_{FB}$ 134. The feedback signal $U_{FB}$ 134 provides the controller 136 with information regarding the output quantity $U_O$ of the power supply 100. In one embodiment, the reference voltage $V_{REF}$ 418 is received at the inverting input of the amplifier 410 while the feedback signal $U_{FB}$ 134 is received at the non-inverting input of the amplifier 410. The output of the amplifier 410 (i.e., feedback reference circuit) further couples to drive logic block 414. The drive logic block also couples to and receives the current sense input signal 140. As discussed above, the current sense input signal 140 represents the switch current $I_D$ 144. Utilizing the output of the amplifier 410 and various other parameters, the drive logic block 414 outputs the drive signal 138 which operates the switch SP 118 to regulate the output quantity $U_O$ to the desired value. In one embodiment, the desired value of the output quantity $U_O$ is partially determined by the reference voltage $V_{REF}$ 418. As such, the controller 136 measures the phase angle through the zero-crossing signal 412 and subsequently alters the reference voltage $V_{REF}$ 418 to facilitate dimming of an LED load.

Referring next to FIG. 5, a functional block diagram of an example digital-to-analog converter (D/A converter) 408 is illustrated including reference voltage $V_{REF}$ 418, current sources 504, 506, 508, and 510, switches S1, S2, S3, and SK, resistor R1 512, reference ground 514, and reference current $I_{REF}$ 516. The offset block 407 is also illustrated in FIG. 5 along with the phase count (B1 through BN) and the offset phase count (BIT1 through BITK).

The D/A converter 408 receives the offset phase count (BIT1 through BITK) from the offset block 407. In one embodiment, the offset block 407 provides the offset amount as described above with respect to FIG. 4. When the phase count (B1 through BN) provided by the counter 406 is less than the offset amount, the controller 136 does not determine that the dimmer circuit 104 is dimming the output of the power supply 100. As such the output of the offset block 407 is a binary output substantially equal to zero. Or in other words, BIT1 through BITK outputted from the offset block are all at a logic low value. However, once the phase count (B1 through BN) is greater than the offset amount provided by the offset block 407, the controller 136 determines that the output of the power supply 100 should be dimmed and the D/A converter 408 will alter the reference voltage $V_{REF}$ 418 such that a higher phase count (B1 through BN) corresponds to a smaller reference voltage $V_{REF}$ 418. However, when the phase count (B1 through BN) is greater than the offset amount provided by the offset block 407, the offset phase count (BIT1 through BITK) outputted by the offset block 407 is the binary value of the offset amount subtracted from the phase count (B1 through BN).

The offset phase count is exemplified in FIG. 5 as bits BIT1 through BITK. In one example, BIT1 is the least significant bit (LSB) and BITK is the most significant bit (MSB). The D/A converter 408 further includes current sources 504, 506, 508, and 510 coupled together by way of switches S1, S2, S3 and SK to provide the reference voltage $V_{REF}$ 418. It should be appreciated that the D/A converter 408 may include K number of current sources and switches, wherein K is a positive integer. In the example shown in FIG. 5, the value of the current provided by current sources 504, 506, 508, and 510 is weighted depending on the bit of the offset phase count (BIT1 through BITK) with which it is associated. For example, BIT1 is coupled to enable and disable the switch S1 to provide a current of $I_{1X}$ from current source 504. BIT2 is coupled to enable and disable the switch S2 to provide a current of $I_{2X}$ from current source 506. For BITK, BITK is coupled to enable and disable switch SK to provide a current of $I_{(2^K)X}$ from current source 510. As shown in FIG. 5, the current $I_{2X}$ from current source 506 is double the value of the current $I_{1X}$ from current source 504. In the example of FIG. 5, current $I_{(2^K)X}$ from current source 510 is a value of $2^K$ time larger than the value of current $I_{1X}$ from current source 504. In one example, a logic high value (1) for any of bits BIT1 through BITK outputted from offset block 407 would correspond to an open (or in other words, disabled) switch while a logic low value (0) for any of bits BIT1 through BITK outputted from offset block 407 would correspond to a closed (or in other words, enabled) switch. As illustrated, current sources 504, 506, 508 and 510 are coupled such that current flows to the reference ground 514. In addition, resistance R1 512 is coupled between switches S1 through SK and the reference ground 514. The currents provide by any enabled current source from current source 504, 506, 508, or 510 are summed together to provide reference current $I_{REF}$ 516 through resistor R1 512. The resultant voltage drop across resistor R1 512 is reference voltage $V_{REF}$ 418. As such, the reference voltage $V_{REF}$ 418 is at its highest value when all the switches (S1 through SK) within the D/A converter 408 are enabled. Or in other words, the reference voltage $V_{REF}$ 418 is at its highest value when the binary value of the offset phase count (BIT1 through BITK) of the offset block 407 is substantially equal to zero. Although the embodiment of the D/A converter shown includes binary-weighted current sources to convert the digital input to an analog voltage output, one of skill in the art would recognize that any of the well known structures and techniques for converting a digital input into a varying analog output could be used in place of the specific DAC structure disclosed so long as the analog output was provided in an appropriate form to be used as a reference value to properly modify the feedback information in accordance with the disclosed invention.

Figure 7:
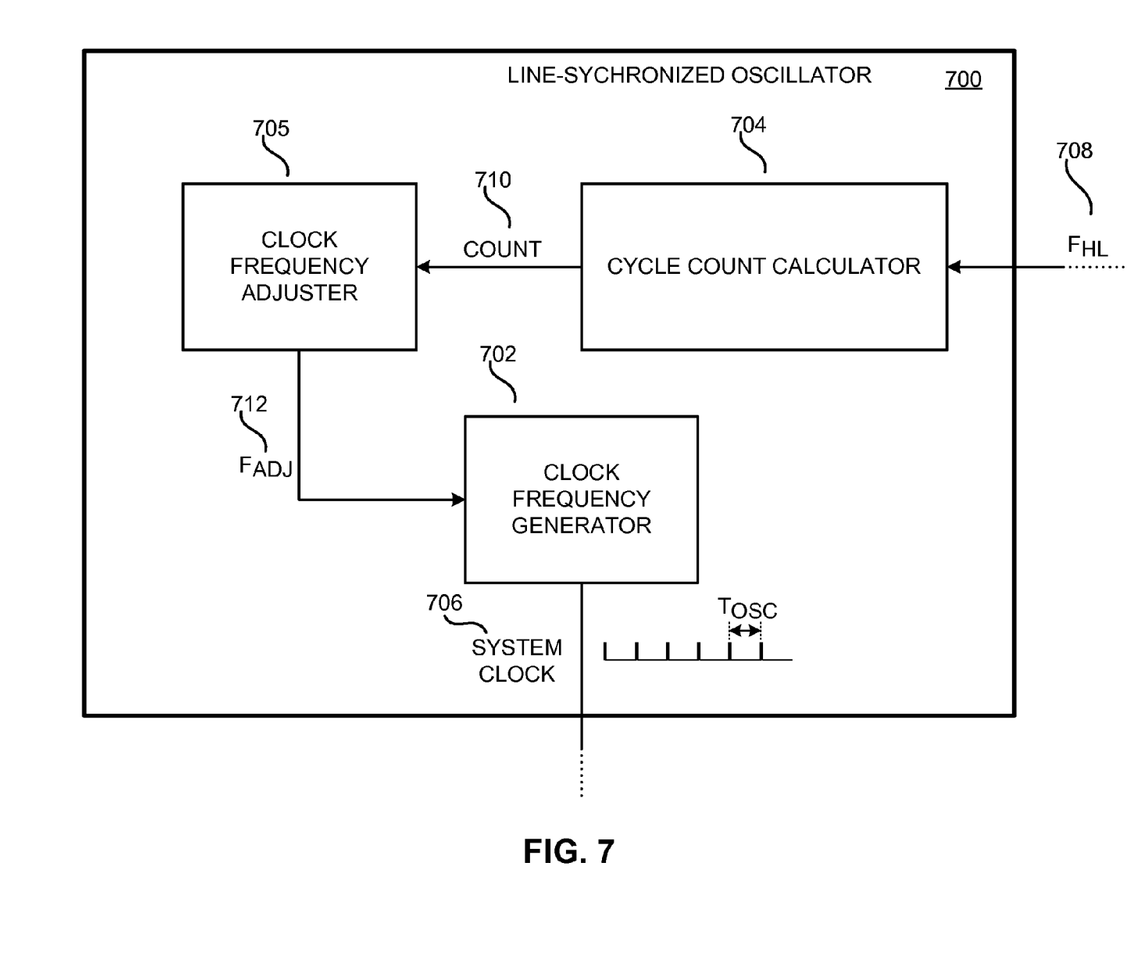
FIG. 7 is a functional block diagram of an example line-synchronized oscillator of FIG. 4 in accordance with an embodiment of the present invention.

Referring now to FIG. 7, a functional block diagram of an example a line-synchronized oscillator 700 is shown in accordance with the teachings of the present invention. As shown, line-synchronized oscillator 700 includes a clock frequency generator 702, a cycle count calculator 704, a clock frequency adjuster 705, a system clock signal 706, a count signal 710, a frequency half line cycle signal $F_{HL}$ 708, and a frequency adjust signal $F_{ADJ}$ 712. It should be appreciated that line-synchronized oscillator 700 and system clock signal 706 is one example of the oscillator 404 and system clock signal 405, respectively, illustrated with regards to FIG. 4. As will be further discussed, for embodiments of the present invention the line-synchronized oscillator 700 adjusts the frequency (or in other words the period) of the system clock signal 706 such that the cycle count N is substantially constant for every half-line cycle $T_{HL}$ of the ac input voltage $V_{AC}$ 102 regardless of variations to the in frequency of the ac input voltage $V_{AC}$ 102. In addition, the line-synchronized oscillator 700 facilitates the use of the controller 136 in regions with different ac line frequencies. For example, the frequency of the ac input voltage $V_{AC}$ 102 in the UK is 50 Hertz (HZ) while the frequency of the ac input voltage $V_{AC}$ 102 in the US is 60 Hz. The controller 136 may be utilized in both countries since the line-synchronized oscillator 700 provides a substantially constant cycle count N regardless of the frequency of the ac input voltage $V_{AC}$ 102.

In operation, line-synchronized oscillator 700 outputs a system clock signal 706 in response to a frequency half line cycle signal $F_{HL}$ 708. In one embodiment, the zero-crossing signal 412 may be utilized as the frequency half line cycle signal $F_{HL}$ 708. The frequency half line cycle signal $F_{HL}$ 708 provides the line-synchronized oscillator 700 with information regarding the frequency of the ac input voltage $V_{AC}$ 102. Or in other words, the frequency half line cycle signal $F_{HL}$ 708 provides the line-synchronized oscillator 700 with information regarding the half line frequency $f_{HL}$ and the length of the half line cycle $T_{HL}$ ($T_{HL}=1/f_{HL}$). In operation, system clock signal 706 is synchronized to have a constant cycle count N during every half line cycle $T_{HL}$ of the ac input voltage $V_{AC}$ 102. To accomplish this, the frequency of system clock signal 706 is adjusted such that the cycle count N of system clock signal 706 remains synchronized to the ac input voltage $V_{AC}$ 102. The frequency of the system clock signal 706 may also be referred to as the oscillator frequency $f_{OSC}$.

When the cycle count N is not constant, variations in the half line frequency $f_{HL}$ will vary the cycle count N. As mentioned above, the oscillator frequency $f_{OSC}$ is a multiple of the half line frequency $f_{HL}$, or mathematically: $f_{OSC}=Mf_{TH}$, M>1, where M is a positive integer. In other words, the half line cycle $T_{HL}$ ($T_{HL}=1/f_{HL}$) is a multiple of the oscillator period, $T_{OSC}$ ($T_{OSC}=1/f_{OSC}$), or mathematically:

$$T_{OSC} = \frac{1}{M} T_{HL}, M > 1.$$

In one embodiment, M is substantially equal to the desired cycle count $N_{DES}$. When the frequency of the ac input voltage $V_{AC}$ 102 (represented by frequency half line cycle signal $F_{HL}$ 708) is decreased, or in other words the half line frequency $f_{HL}$ is decreased, cycle count N may increase over a half line cycle $T_{HL}$ if the frequency of system clock signal 206 (or in other words the oscillator frequency $f_{OSC}$) remains the same. Similarly, when the half line frequency $f_{HL}$ is increased, cycle count N may decrease over a half line cycle $T_{HL}$ if the frequency of system clock signal 206 (or in other words the oscillator frequency $f_{OSC}$) remains the same. In one example, during design of line synchronized oscillator 700, a desired cycle count $N_{DES}$ may be preset to 200 for every half line cycle $T_{HL}$ of the ac input voltage $V_{AC}$ 102. Following this example, line-synchronized oscillator 700 may adjust the frequency of the system clock signal 706 (or in other words the oscillator frequency $f_{OSC}$) such that cycle count N for a half line cycle $T_{HL}$ of the ac input voltage $V_{AC}$ 102 is 200. In one embodiment, the desired cycle count $N_{DES}$ may be 320 and the line-synchronized oscillator 700 may adjust the frequency of the system clock signal 706 (or in other words the oscillator frequency $f_{OSC}$) such that cycle count N for a half line cycle $T_{HL}$ is substantially equal to 320. As mentioned above, the total count per half line cycle $T_{HL}$ 202 (also referred to as the desired cycle count may $N_{DES}$) be chosen such that the percentage error per count is within acceptable tolerance levels. The greater the total count per half line cycle $T_{HL}$ 202, the smaller the percentage error per count, or mathematically:

$$\text{error per count(expressed as a percentage)} = \frac{1}{N_{DES}}(100).$$

In one embodiment, 320 may be chosen for the desired cycle count $N_{DES}$ when the counter 406 is a binary counter since 64 (offset amount) plus 256 is equal to 320. In one embodiment, the counter 406 may utilize an eight bit binary counter which may count to 256 (since $2^8=256$) and 64 (since $2^6=64$).

As shown, cycle count calculator 704 receives the frequency half line cycle signal $F_{HL}$ 708 and calculates the number of cycles of the system clock signal 706 depending on the frequency of the ac input voltage $V_{AC}$ 102 (or in other words, the half line frequency $f_{HL}$ provided by the frequency half line cycle signal $F_{HL}$ 708). In one example, the following equation may be used in cycle count calculator 704 to determine the cycle count during a current half line cycle:

$$N = \frac{C}{f_{HL}},$$

where N is the calculated cycle count for the present half line frequency $f_{HL}$ of the ac input voltage $V_{AC}$ 102 and C is a constant. In operation, count calculator 704 outputs a count signal 710, representative of a difference between current cycle count N and a desired cycle count $N_{DES}$, to clock frequency adjuster 706. For example, if cycle count N is equal to 240 and desired cycle count $N_{DES}$ is equal to 200 then count signal 710 may be representative of a value of 40. The clock frequency adjustor 705 couples to the cycle count calculator 704 and receives the count signal 710. With the count signal 710, the clock frequency adjuster 705 is able to determine the change in frequency required for the system clock 702 to maintain the desired cycle count $N_{DES}$.

In operation, clock frequency adjuster 705 outputs frequency adjust signal $F_{ADJ}$ 712 in response to count signal 710. For example, when desired cycle count $N_{DES}$ is set to 200, clock frequency adjuster 706 outputs a freq adjust signal $F_{ADJ}$ 712 that indicates to increase or decrease the frequency of system clock signal 706 such that the cycle count N will substantially equal desired cycle count $N_{DES}$. In one example, clock frequency adjuster 705 may include a digital to analog converter DAC which receives the count signal 710 as a digital value and outputs frequency adjust signal $F_{ADJ}$ 712 as an analog value. In one example, frequency adjust signal $F_{ADJ}$ signal 712 may be a current with a value determined in response to count signal 710.

As shown, clock frequency generator 702 couples to the clock frequency adjuster 705 and receives the frequency adjust signal $F_{ADJ}$ 712. In one example, clock frequency generator 702 may be a variable frequency oscillator, current controlled oscillator, voltage controlled oscillator, digitally controlled oscillator or the like. In operation, clock frequency generator 702 outputs system clock signal 706 which varies in frequency to maintain a certain desired cycle count $N_{DES}$ for each half line cycle $T_{HL}$. In this manner, line-synchronized oscillator 700 allows for a system clock signal 706 to be synchronized with the ac input voltage $V_{AC}$ 102 (representative of frequency half line cycle signal $F_{FL}$ 708). In other words, the cycle count N of the system clock signal 706 for each half line cycle $T_{HL}$ is maintained at a constant value by adjusting the frequency of system clock signal 706 (or in other words oscillator frequency $f_{OSC}$) as described above.

While the invention herein disclosed has been described by means of specific embodiments, examples and applications thereof, numerous modifications and variations could be made thereto by those skilled in the art without departing from the scope of the invention set forth in the claims.

What is claimed is:

1. A controller for a switched mode power supply, the controller comprising:
   a zero-crossing detector coupled to generate a zero-crossing signal representative of a phase angle of a dimmer output voltage for a half line cycle of the power supply; and
   a drive signal generator to be coupled to control switching of a switch to regulate an output of the power supply in response to a feedback signal representative of the output, wherein the drive signal generator further controls switching of the switch to adjust dimming of the output of the power supply in response to the phase angle indicated by the zero-crossing signal.

2. The controller of claim 1, wherein the zero-crossing detector generates the zero-crossing signal in response to comparing a voltage sense signal representative of the dimmer output voltage with a zero-crossing reference.

3. The controller of claim 1, wherein the zero-crossing signal indicates that a zero-crossing condition exists when a magnitude of the dimmer output voltage is less than a zero-crossing voltage threshold.

4. The controller of claim 1, wherein the zero-crossing detector generates the zero-crossing signal in response to comparing a current sense signal with a zero-crossing reference, wherein the current sense signal is representative of a switch current flowing through the switch.

5. The controller of claim 1, further comprising a feedback reference circuit to be coupled to compare the feedback signal with a reference signal, wherein the controller is adapted to adjust an output of the feedback reference circuit in response to the phase angle and wherein the drive signal generator controls switching of the switch in response to the output of the feedback reference circuit to regulate the output of the power supply.

6. The controller of claim 1, wherein the zero-crossing signal includes a pulse width that is representative of a length of time that a zero-crossing condition at the dimmer output voltage exists.

7. The controller of claim 6, wherein the zero-crossing signal includes a period that is substantially equal to the half line cycle of the power supply.

8. The controller of claim 7, wherein the controller is configured to calculate the phase angle by dividing the pulse width by the half line cycle.

9. The controller of claim 1, wherein the controller and the switch are included in an integrated circuit.

10. A switched mode power supply, comprising:
    a switch;
    an energy transfer element coupled to the switch and coupled to receive a dimmer output voltage; and
    a controller coupled to the switch to regulate an output of the power supply, wherein the controller includes:
       a zero-crossing detector coupled to generate a zero-crossing signal representative of a phase angle of the dimmer output voltage for a half line cycle of the power supply; and
       a drive signal generator coupled to control switching of the switch to regulate the output of the power supply in response to a feedback signal representative of the output, wherein the drive signal generator further controls switching of the switch to adjust dimming of the output of the power supply in response to the phase angle indicated by the zero-crossing signal.

11. The power supply of claim 10, wherein the zero-crossing detector generates the zero-crossing signal in response to comparing a voltage sense signal representative of the dimmer output voltage with a zero-crossing reference.

12. The power supply of claim 10, wherein the zero-crossing signal indicates that a zero-crossing condition exists when a magnitude of the dimmer output voltage is less than a zero-crossing voltage threshold.

13. The power supply of claim 10, wherein the zero-crossing detector generates the zero-crossing signal in response to comparing a current sense signal with a zero-crossing reference, wherein the current sense signal is representative of a switch current flowing through the switch.

14. The power supply of claim 10, further comprising a feedback reference circuit to be coupled to compare the feedback signal with a reference signal, wherein the controller is adapted to adjust an output of the feedback reference circuit in response to the phase angle and wherein the drive signal generator controls switching of the switch in response to the output of the feedback reference circuit to regulate the output of the power supply.

15. The power supply of claim 10, wherein the zero-crossing signal includes a pulse width that is representative of a length of time that a zero-crossing condition at the dimmer output voltage exists.

16. The power supply of claim 15, wherein the zero-crossing signal includes a period that is substantially equal to the half line cycle of the power supply.

17. The power supply of claim 16, wherein the controller is configured to calculate the phase angle by dividing the pulse width by the half line cycle.

18. The power supply of claim 10, further comprising a dimmer circuit coupled to the energy transfer element to provide the dimmer output voltage having the phase angle.

19. The power supply of claim 10, wherein the output of the power supply is to be coupled to a load that includes an array of light emitting diodes.

20. The power supply of claim 10, wherein the controller and the switch are included in an integrated circuit.

* * * * *